United States Patent [19]

Loverich et al.

[11] Patent Number: 5,007,376

[45] Date of Patent: Apr. 16, 1991

[54] SPAR BOUY PEN SYSTEM

[75] Inventors: Gary F. Loverich; Barry A. Griffin, both of Bainbridge Island, Wash.

[73] Assignee: Nor'Eastern Trawl Systems, Inc., Bainbridge Island, Wash.

[21] Appl. No.: 339,676

[22] Filed: Apr. 18, 1989

[51] Int. Cl.⁵ .............................................. A01K 61/00
[52] U.S. Cl. ...................................................... 119/3
[58] Field of Search .................... 119/2, 3, 4; 441/21, 441/23, 28; 43/7, 14, 103, 104, 105

[56] References Cited

U.S. PATENT DOCUMENTS

| 85,126 | 12/1968 | Pitt | 43/7 X |
|---|---|---|---|
| 215,031 | 5/1879 | Webb | 43/103 |
| 1,485,875 | 3/1924 | O'Malley | 43/103 |
| 4,147,130 | 4/1979 | Goguel | 119/3 |
| 4,615,301 | 10/1986 | Maekawa et al. | 119/3 |

FOREIGN PATENT DOCUMENTS

| 0130198 | 3/1978 | German Democratic Rep. | 119/3 |
| 0254517 | 3/1988 | German Democratic Rep. | 119/3 |
| 87/03170 | 6/1987 | PCT Int'l Appl. | 119/3 |
| 1499468 | 2/1978 | United Kingdom | 119/3 |
| 2184631 | 7/1987 | United Kingdom | 119/3 |
| 2189671 | 11/1987 | United Kingdom | 119/2 |

Primary Examiner—Robert P. Swiatek
Assistant Examiner—Todd E. Manahan
Attorney, Agent, or Firm—Christensen, O'Connor, Johnson & Kindness

[57] ABSTRACT

A spar buoy pen system (10) formed of a net pen (14), vertical spar buoys (16), and anchors (18). The spar bouys (16) are formed of elongated tubular columns having a center of ballast above the center of gravity to flow in a substantially upright position. Anchor lines (22), auxiliary floats (24), and attachment lines (32) deflect the spar buoy (16) at a predetermined angle such that the spar buoys (16) and the anchors (18) cooperate to hold the net pen (14) in a predetermined configuration and in a taut condition.

8 Claims, 1 Drawing Sheet

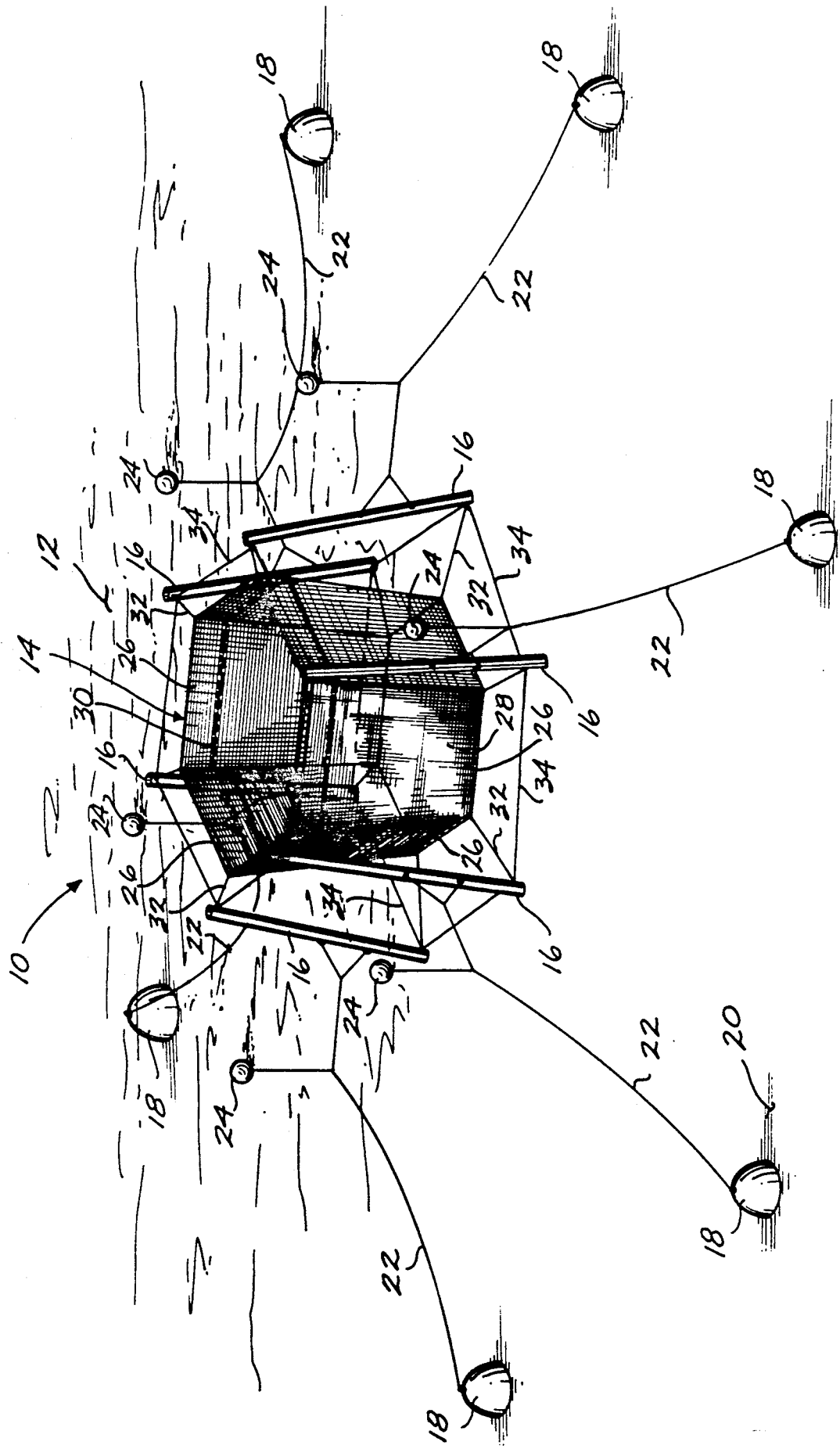

SPAR BOUY PEN SYSTEM

TECHNICAL FIELD

The present invention pertains to net pens for growing fish and other marine life and organisms and, more particularly, to a spar buoy pen system for use in open waters.

BACKGROUND

Fish pens are generally constructed of fish netting that is formed to have a closed bottom, closed sides, and an open or closed top. A horizontal floating frame structure that lies flat on the ocean surface is used to shape the netting and provide a working platform. Weights are hung from the netting to provide draft and shape for the pen. Although these horizontal frame systems have been generally suitable for their purposes, they have several drawbacks.

When used in closed or protected waters, horizontal frame systems are visually objectionable, are inefficient in the use of pen volume, and tend to accumulate waste that pollutes the aquatic environment. While use of the pen system in open waters will avoid this pollution, the horizontal frame systems currently in use with these pen systems are not usable in open waters because of the roughness of the water and the unsteadiness of current flow. In particular, the surface-supported horizontal frames are subject to wave-induced forces, responding quickly to the passing of waves with violent motions that cause extreme stress on the structural components of the frame. Furthermore, the use of weights to shape the pen vertically is not compatible with the open water because water currents will move the weights, thus reducing the usable volume of the pen. In other words, the weights become less effective as current increases. As a result, the floating frame pen systems using suspended weights are limited to shallow, vertical configurations that can only be used in closed or protected waters where strong currents and wave conditions are not present. Hence, there is a need for a floating pen system that is stable enough to maintain a workable configuration without undue stress in large bodies of open water or bodies of water where strong currents are present.

SUMMARY OF THE INVENTION

The present invention is directed to a spar buoy pen system for holding a pen in a predetermined configuration in an open body of water. The pen system comprises a flexible wall member that restricts movement of water and/or marine life to a predetermined area. The system further includes at least one, and preferably a plurality of elongate buoyancy members, preferably having a tubular shape, that are attached to the flexible wall to float in a substantially upright position. Anchors are attached to each of the elongate buoyancy members to hold the elongate buoyancy members at a fixed location in the open body of water such that the flexible wall is held in a taut condition in a predetermined configuration.

In accordance with another aspect of the present invention, auxiliary floats are attached to the anchor lines between each anchor and each elongate buoyancy member to provide an upward force to the anchor lines to urge the elongate buoyancy member laterally outward from the flexible wall to maintain the flexible wall in a taut condition.

In accordance with another aspect of the present invention, the elongate buoyancy members are further attached to each other such that, upon removal of the flexible wall, the elongate buoyancy members will maintain their positions in the predetermined configuration.

In accordance with yet another aspect of the present invention, the elongate buoyancy members are displaced from the upright position at a predetermined angle. This predetermined angle is in the range of 5° to 25° from the vertical, and preferably is 15° from the vertical.

In accordance with still yet another aspect of the present invention, the flexible wall may comprise either a net having a mesh of a predetermined size, a fabric cloth, or a combination of these different materials that permits a limited flowthrough of liquid.

As will be readily appreciated from the foregoing description, the spar buoy pen system makes it possible to use a net pen aquaculture system in open and unprotected waters. The spar buoy as a floating vertical column has a draft much greater than its beam or depth. As a result of its shape and small waterplane area, the spar buoy is "transparent" to prevailing wave spectra, thus minimizing wave-induced motions. In addition, the compressive strength of the spars fixes the depth of the net pen to a predetermined value, which is independent of prevailing current strength. Finally, because of their stability and compressive strength, the spar buoys can be used to house auxiliary equipment or extensions can be added above the buoys for bird nets, etc. The system is easily constructed, maintained, and relocated, and it easily accommodates pens of a variety of shapes.

BRIEF DESCRIPTION OF THE DRAWINGS

The foregoing and other features and advantages of the present invention will become more readily appreciated and better understood when taken in conjunction with the accompanying drawing, wherein:

FIG. 1 is an isometric view of a spar buoy pen system formed in accordance with the present invention.

DESCRIPTION OF THE PREFERRED EMBODIMENT

FIG. 1 illustrates a representative embodiment of the spar buoy pen system 10 situated in a body of water 12. The spar buoy pen system 10 includes a net pen 14, a plurality of elongate buoyancy members, in this case spar buoys 16 attached to the net pen 14, and anchors 18 resting on the sea floor 20. Each spar buoy 16 has an anchor 18 attached to it with an anchor line 22. An auxiliary float 24 is attached to each anchor line 22.

The net pen 14 is formed from six generally vertically oriented, flexible walls 26 and an attached flexible bottom 28. The flexible walls 26 and bottom 28 are constructed of netting material having a mesh size selected to restrict desired marine life or marine organisms within the net pen 14. Because fish tend to swim together in large groups, the walls 26 taper inward at the bottom 28 to eliminate dead space and make efficient use of the volume within the net pen 14. The net pen 14 has no rigid structure in itself, relying on the attached spar buoys 16 and anchors 18 to maintain the hexagonal configuration in a taut condition. Although the representative embodiment illustrates the net pen 14 being formed of netting, a fabric-like nylon or canvas could be used if desired.

The spar buoys 16 are elongate tubular columns that may be formed from steel pipe or plastic. The top and bottom are capped to provide a totally enclosed watertight chamber within each buoy 16, creating buoyancy. Flotation devices may be used with the buoys 16 to provide additional buoyancy. In addition, ballasts in the form of some type of weight must be added near the bottom of each spar buoy 16. In order for the invention to properly function, it is critical that the center of buoyancy be above the center of gravity in each spar buoy 16 so that the buoy 16 will float in a substantially upright position. The amount of floatation and ballast used on each buoy will vary, depending on whether the buoy is to be used fully submerged or whether a portion of the buoy is to remain above the waterline. In the representative embodiment illustrated in FIG. 1, the waterline 30 is denoted by a darkened ring around the net pen 14.

Each spar buoy 16 is attached to the net pen 14 with an attachment line 32 at the top and bottom of the buoy 16. In addition, connecting lines 34 attach the spar buoys 16 to each other at their tops and bottoms. While not critical to practicing the present invention, these connecting lines 34 will maintain the spar buoy 16 in their predetermined configuration, in this case, the hexagonal shape, even when the net pen 14 is removed. This is to facilitate removal and replacement of the net pen 14 in the open water without having to remove or replace the spar buoys 16.

Each spar buoy 16 is anchored at a predetermined location to the sea floor 20 by an anchor 18. The anchor may be any suitable weighted article that will remain stationary when placed on the sea floor 20. The anchor lines 22 are shown attached to each buoy 16 at one or more points, and preferably at two locations to stabilize the buoy 16 in the water. To avoid a downward pull on the buoys from the anchor lines 22, an auxiliary float 24 is attached to each anchor line 22 to provide an upward force on the anchor line 22. This results in the anchor line 22 exerting a lateral force on each buoy 16 to urge each spar buoy 16 laterally outward from the net pen 14 to thereby maintain the net pen 14 in a taut, or stretched open state, between the buoys.

Although the spar buoy 16 may be used in a substantially upright position, this may be too flexible in some systems. It has been found that if the spar buoys are deflected from the vertical, they will reach a point where they are resistant to further deflection because of increased righting moment. Depending on the configuration of the particular spar buoy, this angle has been found to be in the range of 5° to 25°, and, in the representative embodiment shown in FIG. 1, is preferably 15°. Consequently, the anchors 18 and the deflected spar buoys 16 cooperate to hold the net pen 14 in the hexagonal configuration and in a taut condition. To assist in maintaining the spar buoys 16 at an angle, the attachment lines 32 at the top of each buoy 16 are shorter than the attachment lines 32 at the bottom of each buoy 16, and the anchor lines 22 are attached preferably below the midpoint of each spar buoy 16.

It is to be appreciated that, while a representative embodiment of the invention has been shown and described, various changes may be made therein without departing from the spirit and scope of the invention. For instance, the net pen 14 may have a square, triangular or octagonal shape. Furthermore, the net pen 14 may be replaced with a single flexible wall formed of either netting, fabric, or canvas. In addition, the spar buoy 16 may be used to hold platforms, feeding systems, or storage containers. Similarly, masts, bird nets, predator nets, and other devices may be attached to the top of each of the buoys 16.

As will be readily appreciated from the foregoing, the design illustrated herein incorporates the use of spar buoys to shape and anchor net pens used to grow fish for marketing, research or recreation. With the spar buoy anchored to the bottom of the body of water and the net pen attached to the spar buoy at the top and bottom, or along its entire draft, the spar buoy fixes the maximum designed depth of the net pen vertically by virtue of its vertical stability. The direction and magnitude of the anchoring forces acting through the spar buoy and the net fix the final net pen configuration in length, width, and depth, and maintain the net pen in a taut condition. The spar buoy net pen system can be used in any configuration, with as few as three for a triangular pen, or more buoys arranged in a line may be used to form a wall, depending upon the final net pen configuration. A wall of netting or fabric can also be used as a current "blocker" to reduce current and forces on a downstream pen or object in its "shadow." This use can be independent of raising fish. In this system, the anchors 18, the spar buoy 16, and the net pen 14 all form a flexible structure that can be used to hold a variety of marine species for aquacultural, recreational or research purposes. Furthermore, the spar buoys make it possible to use a more solid, flexible wall such as fabric or canvas because it will not be affected by currents or waves. The spar buoy net pens may also be arranged in systems of nets that use one or more spar buoys in common.

The embodiments of the invention in which an exclusive property or privilege is claimed are defined as follows:

1. A spar buoy pen comprising:
   a flexible water-permeable wall;
   at least two buoyancy members having an elongated shape and weighted to float substantially vertically attached to said flexible wall at spaced-apart locations whereby at least one of the elongated buoyancy members is connected to said flexible wall by a first upper attachment line and a second lower attachment line, said first upper attachment line being shorter than said second lower attachment line so that said at least one buoyancy member is displaced from the vertical position at a pre-determined angle; and
   separate anchor means attached to each said buoyancy member, each said anchor means urging the buoyancy member attached thereto away from said flexible wall so that said flexible wall is suspended between the buoyancy members.

2. The spar buoy pen of claim 1, wherein:
   said flexible wall is an enclosed wall;
   at least three said buoyancy members are attached to said flexible wall at spaced-apart locations.

3. The spar buoy pen of claim 2, wherein at least one said anchor means includes an anchor attached to said associated buoyancy member by an anchor line and an auxiliary float attached to said anchor line to urge said associated buoyancy member away from said flexible wall.

4. The spar buoy pen of claim 1, wherein at least one said anchor means includes an anchor attached to said associated buoyancy member by an anchor line and an auxiliary float attached to said anchor line to urge said buoyancy member away from said flexible wall.

5. The spar buoy pen of claim 1, wherein said predetermined angle is in the range of 5° to 25° from the vertical toward said flexible wall.

6. The spar buoy pen of claim 1, wherein said predetermined angle is 15° from the vertical towards said flexible wall.

7. The spar buoy pen of claim 1, wherein said predetermined angle is in the range of 5° to 25° from the vertical towards said flexible wall.

8. The spar buoy pen of claim 1, wherein said predetermined angle is 15° from the vertical towards said flexible wall.

* * * * *

UNITED STATES PATENT AND TRADEMARK OFFICE
CERTIFICATE OF CORRECTION

PATENT NO. : 5,007,376

DATED : April 16, 1991

INVENTOR(S) : Loverich et al.

It is certified that error appears in the above-identified patent and that said Letters Patent is hereby corrected as shown below:

ON THE TITLE PAGE:

| Column | Line | |
|---|---|---|
| [54] | Title | Delete "BOUY" and insert --BUOY-- therefor |
| 2 | 57 | Delete "oriented," and insert --oriented-- therefor |
| 5 | 5 | Delete "toward" and insert --towards-- therefor |
| [57] | 4 | Delete "bouys" and insert --buoys-- therefor |
| [57] | 6 | Delete "flow" and insert --float-- therefor |
| [57] | 8 | Delete "buoy" and insert --buoys-- therefor |

Signed and Sealed this

Fifteenth Day of December, 1992

Attest:

DOUGLAS B. COMER

Attesting Officer

Acting Commissioner of Patents and Trademarks